US008717312B2

(12) United States Patent
Huang et al.

(10) Patent No.: US 8,717,312 B2
(45) Date of Patent: May 6, 2014

(54) TOUCH SENSING DEVICE

(75) Inventors: Kung-Chieh Huang, Hsinchu (TW); Shih-Po Chou, Hsinchu (TW); Seok Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 803 days.

(21) Appl. No.: 12/843,642

(22) Filed: Jul. 26, 2010

(65) Prior Publication Data
US 2012/0019450 A1 Jan. 26, 2012

(51) Int. Cl.
*G06F 3/041* (2006.01)
*G06F 3/045* (2006.01)
*G06K 11/06* (2006.01)
*G08C 21/00* (2006.01)
*G06F 3/044* (2006.01)

(52) U.S. Cl.
USPC ............... 345/173; 178/18.01; 178/18.06; 345/174

(58) Field of Classification Search
USPC ............... 345/173–174; 178/18.01, 18.06
See application file for complete search history.

(56) References Cited

U.S. PATENT DOCUMENTS

| 5,869,791 | A | 2/1999 | Young |
| 7,129,935 | B2 | 10/2006 | Mackey |
| 7,202,859 | B1 | 4/2007 | Speck et al. |
| 8,159,467 | B2 | 4/2012 | Gray et al. |
| 2006/0097991 | A1* | 5/2006 | Hotelling et al. ............. 345/173 |
| 2008/0007534 | A1 | 1/2008 | Peng et al. |
| 2010/0045614 | A1 | 2/2010 | Gray et al. |
| 2010/0045615 | A1 | 2/2010 | Gray et al. |
| 2010/0079393 | A1* | 4/2010 | Dews ............................ 345/173 |
| 2011/0007020 | A1* | 1/2011 | Hong et al. ................... 345/174 |

FOREIGN PATENT DOCUMENTS

CN 101655754 A 2/2010

* cited by examiner

*Primary Examiner* — Kenneth Bukowski
(74) *Attorney, Agent, or Firm* — Morris Manning & Martin, LLP; Tim Tingkang Xia, Esq.

(57) ABSTRACT

The present invention relates to a touch sensing device. In one embodiment, the touch sensing device includes a plurality of first touch electrodes and a plurality of second touch electrodes, alternately arranged along a first direction and a second direction substantially perpendicular to the first direction to form a sensing matrix, such that each first touch electrode and a corresponding second touch electrode are entangled each other along with at least one of the first and second directions.

24 Claims, 7 Drawing Sheets

TOUCH SENSING DEVICE

FIELD OF THE INVENTION

The present invention relates generally to a touch sensing device, and more particularly to touch sensor designs of a touch sensing device.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch screen associated with the plurality of touch sensors.

There are at least two types of touch sensors available for detection of a touch location. One is a resistive touch sensor that includes two layers of transparent conductive material, such as a transparent conductive oxide, separated by a gap. When touched with sufficient force, one of the conductive layers flexes to make contact with the other conductive layer. The location of the contact point is detectable by a controller that senses the change in resistance at the contact point. In response, the controller performs a function, if any, associated with the contact point. The other is a capacitive touch sensor that typically includes a single conductive layer for touch detection. A finger touch to the sensor provides a capacitively coupled path from the conductive layer through the body to earth ground. The location of the contact point is detectable by a controller that measures a capacitance change in a capacitively coupled electrical signal at the touch location. Accordingly, the controller performs a function, if any, associated with the touch location.

Conventional capacitive touch panels utilize diamond-type electrodes, as shown in FIG. 1a, and triangle-type electrodes, as shown in FIG. 1b, as sensing units. For a triangle-type touch panel, it utilizes the variation of the capacity generated between two up-and-down cross triangles and a figure to detect the coordinates of the touch location. However, its linearity is not very accurate. The triangle-type touch panel is rarely used now.

For the diamond-type touch panel, a plurality of first touch electrodes 110 and a plurality of second touch electrodes 120 are spatially arranged to form a sensing array. The width of the diamond electrode defines a pitch of the sensing units. For a large sized panel, either the pitch of the sensing units needs being enlarged, or the number of the sensing units needs being increased. However, the pitch cannot be enlarged indefinitely, since the limitation of the figure size. If the pitch is too large, the finger cannot simultaneously touch two or more sensing units to induce an effective capacity, thereby not being able precisely to detect the coordinates of the touch location by utilizing the variation of the capacity of the two or more sensing units. Therefore, the pitch of the sensing units is generally of about 4-6 mm. On the other hand, since the channels supported by an IC are also limited, the number of the sensing units cannot be increased unlimitedly. Therefore, the diamond-type capacitive touch panel is usually designed to have a size of about 12 inches or less. If the size is larger than 12 inches, the touch detection has a poor linearity, and touch panel can not be utilized for precisely detecting the coordinates.

Therefore, a heretofore unaddressed need exists in the art to address the aforementioned deficiencies and inadequacies.

SUMMARY OF THE INVENTION

The present invention, in one aspect, relates to a touch sensing device. In one embodiment, the touch sensing device includes a substrate having a plurality of first sensing regions and a plurality of second sensing regions arranged in a matrix. The touch sensing device also includes a plurality of first touch electrodes, alternately arranged along a first direction, each of the first touch electrodes including a plurality of first sensing pads. Each of the first sensing pads has a first sensing portion disposed in a corresponding first sensing region and a first complementary portion disposed in a corresponding second sensing region. Further, the touch sensing device includes a plurality of second touch electrodes, alternately arranged along a second direction substantially perpendicular to the first direction to form a sensing matrix, each of the second touch electrodes including a plurality of second sensing pads. Each of the second sensing pads has a second sensing portion disposed in a corresponding second sensing region and a second complementary portion disposed in a corresponding first sensing region. In one embodiment, a shape of the first complementary portion and the second complementary portion comprises a triangle or a rhombus.

Each of the first touch electrodes and the second touch electrodes respectively is formed of a conductive material. The first sensing pads of each of the first touch electrodes are electrically connected to each other in series, and the second sensing pads of each of the second touch electrodes are electrically connected to each other in series. In one embodiment, the plurality of first touch electrodes and the plurality of second touch electrodes are electrically insulated from one another.

Each of the first sensing pads is identical to or substantially different from each of the second sensing pads. In one embodiment, each of the first sensing pads has a shape of a polygon with more than four sides, and each of the second sensing pads has a shape of a polygon with more than four sides. The first sensing pads and the second sensing pads are disposed along the first direction and the second direction, respectively, such that each of the first sensing pads is surrounded by four second sensing pads and vice versus.

In one embodiment, each short side of each of the first sensing pads is closest to and faces one shortest side of each of the second sensing pads correspondingly.

In one embodiment, each of the first sensing pads further includes at least one first extension portion extended to another first sensing pad adjacent thereto, and each of the second sensing pads further includes at least one second extension portion extended to another second sensing pad adjacent thereto. Further, each of the first sensing pads comprises at least one first recesses corresponding to the at least one first extension portion, and each of the second sensing pads comprises at least one second recesses corresponding to the at least one second extension portion.

The first and second sensing pads are disposed such that each first sensing pad and the corresponding second sensing pad are substantially complementary to each other, and are entangled each other along with the first and second directions In one embodiment, each of the first sensing pads and each of the second sensing pads are formed symmetrically along the first and second directions and have a polygon structure that is substantially complementary to each other.

In another embodiment, each of the first sensing pads and each of the second sensing pads are substantially identical to each other and comprise a star-like structure having a rectangular body and four rectangular members, each rectangular member protruded from a corresponding side, respectively, of the rectangular body, such that when disposed, each first sensing pad and a corresponding second sensing pad are entangled each other along with the first and second directions.

In another aspect, the present invention relates to a touch sensing device. In one embodiment, the touch sensing device includes a plurality of first touch electrodes, each first touch electrode having a plurality of first sensing pads, and a plurality of second touch electrodes, each second touch electrode having a plurality of second sensing pads, alternately arranged along a first direction and a second direction substantially perpendicular to the first direction to form a sensing matrix, such that each first sensing pad and a corresponding second sensing pad are entangled each other along with at least one of the first and second directions.

Each of the plurality of first touch electrodes and the plurality of second touch electrodes respectively is formed of a conductive material. The plurality of first touch electrodes and the plurality of second touch electrodes are electrically insulated from one another. The first sensing pads of each of the first touch electrodes are electrically connected to each other in series, and the second sensing pads of each of the second touch electrodes are electrically connected to each other in series.

Each of the first sensing pads is identical to or substantially different from each of the second sensing pads.

In one embodiment, each of the first sensing pads is of a polygon with more than four sides, and each of the second sensing pads is of a polygon with more than four sides.

In one embodiment, each of the first sensing pads is a hexagon with two isosceles triangles oriented such that the vertex of one isosceles triangle is opposite to the vertex of the other isosceles triangle, and the base sides of the two isosceles triangles are partially overlapped so that the hexagon has four long sides with an equal first length, L1, and two short sides with an equal second length, L2<L1, and each side parallel to its corresponding opposite side, wherein each short side defines an angle, $\alpha$, relative to two adjacent long sides, respectively. Each of the second sensing pads is a hexagon having two longest sides with an equal first length, J1, and two shortest sides with an equal second length, J2<J1, and each side parallel to its corresponding opposite side, wherein each shortest side defines an angle, $\beta$, relative to two adjacent sides, respectively, wherein the angles $\alpha$ and $\beta$ are complementary to each other, J1=L2 and J2=L2. The first sensing pads and the second sensing pads are disposed along the first direction and the second direction, respectively, such that each of the first sensing pads and the corresponding second sensing pads are entangled each other along with the second direction, and each of the first sensing pads is surrounded by four second sensing pads and vice versus. Each short side of the first sensing pad is closest to and faces one shortest side of the second sensing pad correspondingly.

In another embodiment, each of the first sensing pads comprises a plurality of first sensing portions forming a diamond-shaped polygon, at least one first complementary portion and at least one first extension portion formed at corresponding vertexes of the diamond-shaped polygon along one of the first and second directions, wherein each of the at least one first complementary portion and the at least one first extension portion is characterized with a dagger-like polygon, and wherein the plurality of first sensing portions defines a plurality of recesses having geometric shapes substantially complementary to the at least one first complementary portion and the at least one first extension portion. Each of the second sensing pads comprises a plurality of second sensing portions forming a diamond-shaped polygon, at least one second complementary portion and at least one second extension portion formed at corresponding vertexes of the diamond-shaped polygon along the other of the first and second directions, wherein each of the at least one second complementary portion and the at least one second extension portion is characterized with a dagger-like polygon, and wherein the plurality of second sensing portions defines a plurality of recesses having geometric shapes substantially complementary to the at least one second complementary portion and the at least one second extension portion. The first and second sensing pads are disposed such that each first sensing pad and the corresponding second sensing pad are substantially complementary to each other, and are entangled each other along with the first and second directions.

In yet another embodiment, each of the first sensing pads and each of the second sensing pads are substantially identical to each other and comprises a star-like structure having a rectangular body and four rectangular members, each rectangular member protruded from a corresponding side, respectively, of the rectangular body, such that when disposed, each first sensing pad and a corresponding second sensing pad are entangled each other along with the first and second directions.

In a further embodiment, each of the first sensing pads is formed symmetrically along the first and second directions and has an I-like structure along the first direction, a pair of polygon structures symmetrically extended from the middle portion of the I-like structure alone the second direction, and a pair of triangular tips symmetrically extending the pair of polygon structures, respectively, alone the second direction. Each of the second sensing pads is formed symmetrically along the first and second directions and has a polygon structure that is substantially complementary to each of the first sensing pads. The first and second sensing pads are disposed such that each first sensing pad and the corresponding second sensing pad are substantially complementary to each other, and are entangled each other along with the first and second directions.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
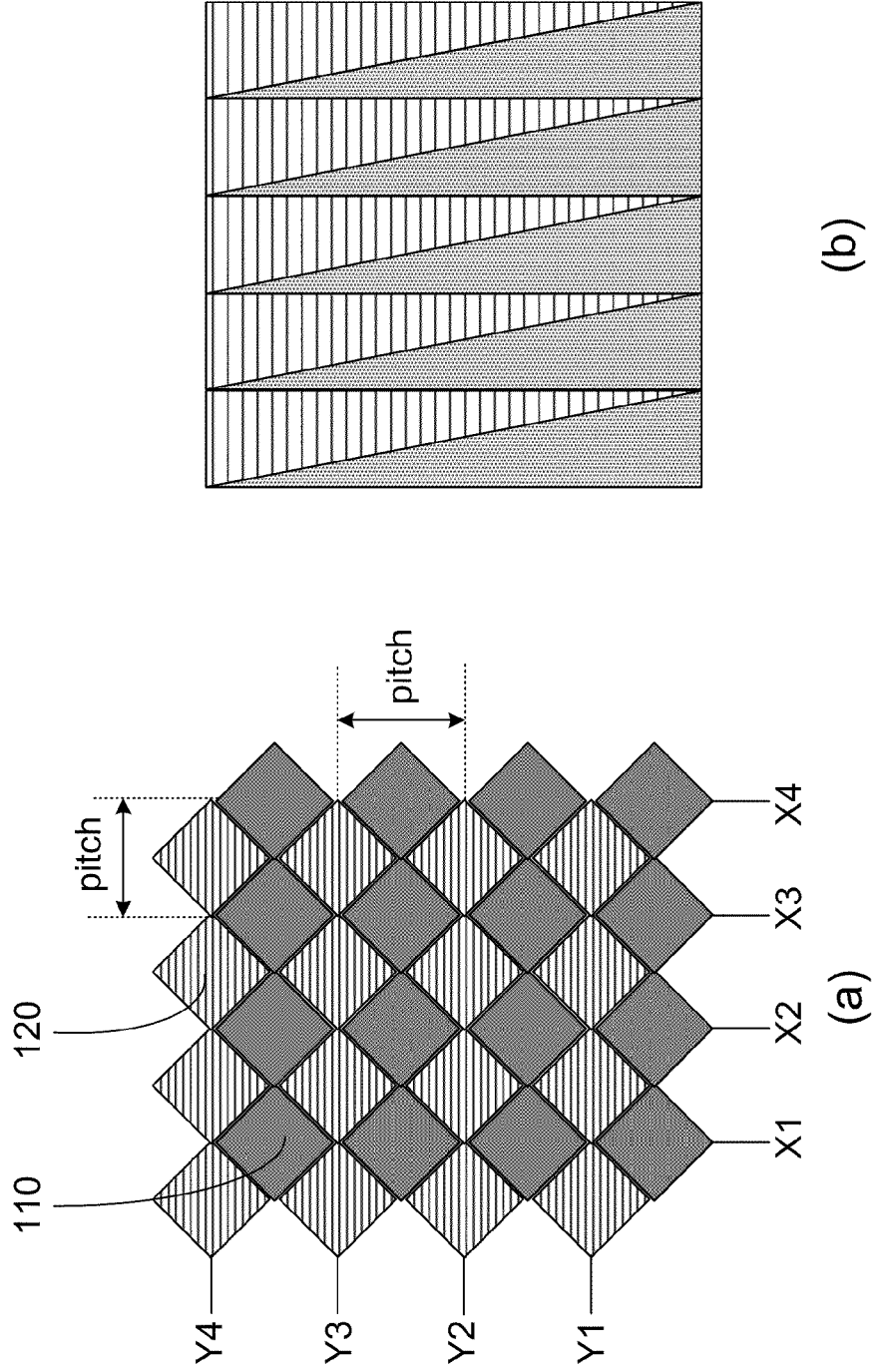
FIG. 1 shows schematically (a) a top view of a conventional touch sensor layout of diamond-type electrodes, and (b) a top view of another conventional touch sensor layout of triangle-type electrodes.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 2-7. In accordance with the purposes of this invention, as embodied and broadly described herein, this invention, in one aspect, relates to touch electrodes/sensors designs of a capacitive touch sensing device.

Figure 2:
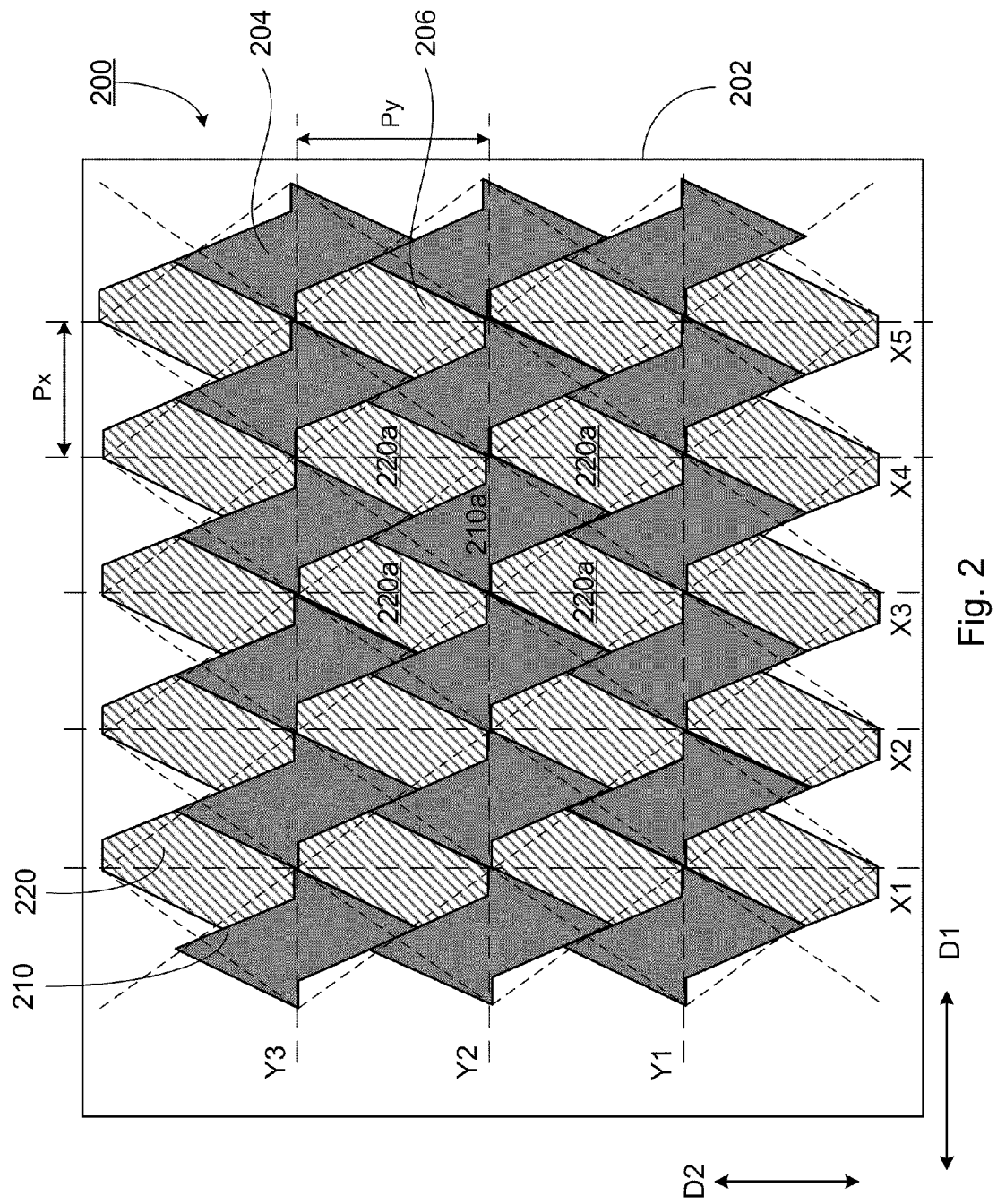
FIG. 2 shows schematically a top view of a touch sensor layout of the first and second electrodes according to the first embodiment of the present invention.
Figure 3:
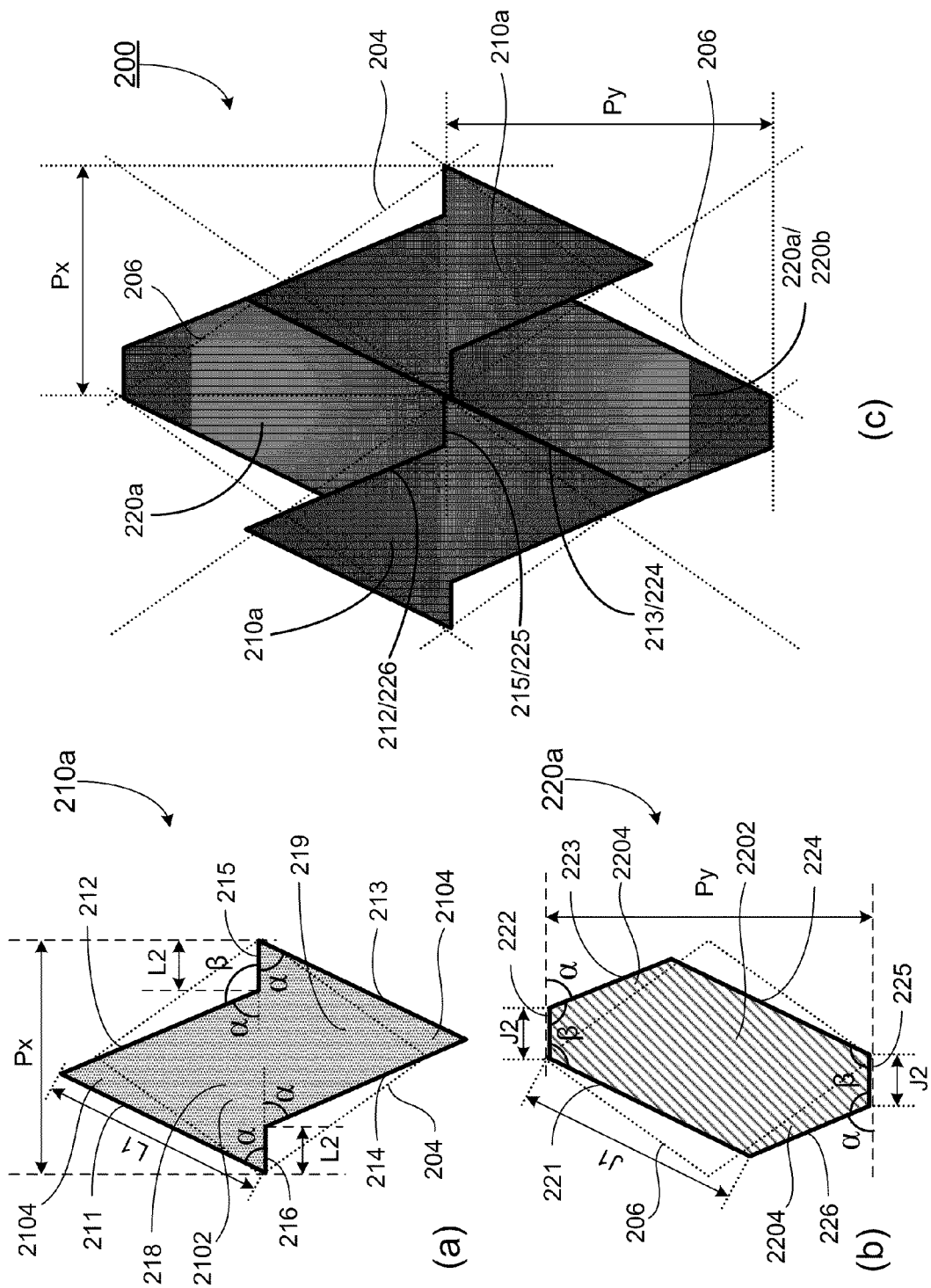
FIG. 3 shows schematically (a) a first sensing pad, (b) a second sensing pad, and (c) a top view of a touch sensing pad layout of the first sensing pads and second sensing pads according to a first embodiment of the present invention.

As shown in FIG. 2, the touch sensing device, in one embodiment, includes a substrate 202 having a plurality of first sensing regions 204 and a plurality of second sensing regions 206 arranged in the form of a matrix, a plurality of first touch electrodes 210 and a plurality of second touch electrodes 220, alternately arranged along a first direction D1 and a second direction D2 perpendicular to the first direction D1 to form a sensing matrix/array 200, such that each first touch electrode 210 and a corresponding second touch electrode 220 are entangled each other along with at least one of the first and second directions D1 and D2.

The first touch electrodes 210 in each column of the sensing matrix are electrically connected to each other in series by column row control lines. The second touch electrodes 220 in each row of the sensing matrix are electrically connected to each other in series by a corresponding row control lines. These row control lines and column row control lines are electrically conductive. The first and second touch electrodes 210, 220 are formed of a conductive material. The conductive material includes, but not limited to, a transparent conductive materials, such as an indium tin oxide (ITO), an indium zinc oxide (IZO), an cadmium tin oxide (CTO), cadmium zinc oxide (CZO), aluminum zinc oxide (AZO), aluminum tin oxide (ATO), hafnium oxide (HfO), indium tin zinc oxide (ITZO), zinc oxide, or combinations thereof, non-transparent conductive materials, such as Au, Ag, Cu, Fe, Sn, Pb, Cd, Mo, Al, Ti, Ta, Hf, oxide thereof, nitride thereof, oxy-nitride thereof, alloy thereof, or combinations thereof.

The plurality of first touch electrodes 210 and the plurality of second touch electrodes 220 are electrically insulated from one another. A dielectric layer (not shown) may be disposed between the first touch electrodes 210 and the second touch electrodes 220 for electrical insulation.

Referring to FIG. 2, the touch sensing array 200 is schematically shown. Each first touch electrode 210 can be identical to or substantially different from each second touch electrode 220. In this exemplary embodiment, each first touch electrode 210 is substantially different from each second touch electrode 220. Each first touch electrode 210 includes a plurality of first sensing pads 210a connected each other in series and having a shape of a polygon with more than four sides, and each second touch electrode 220 includes a plurality of second sensing pads 220a connected each other in series and having a shape of a polygon with more than four sides. In this exemplary embodiment, each of the plurality of first sensing pads 210a is identical to each other, and each of the plurality of second sensing pads 220a is identical to each other as well, while the first sensing pad 210a and the second sensing pad 220a are substantially different from each other.

Specifically, as shown in FIGS. 3a-3c, each of the first sensing pads 210a has a first sensing portion 2102 disposed in a corresponding first sensing region 204 and a first complementary portion 2104 disposed in a corresponding second sensing region 206. Each of the second sensing pads 220a has a second sensing portion 2202 disposed in a corresponding second sensing region 206 and a second complementary portion 2204 disposed in a corresponding first sensing region 204. In the exemplary embodiment, a shape of the first complementary portion 2104 and the second complementary portion 2204 comprises a triangle.

As shown in FIG. 3a, the first sensing pads 210a is of a hexagon characterized with two isosceles triangles 218 and 219 oriented such that the vertex of one isosceles triangle 218 is opposite to the vertex of the other isosceles triangle 219, and the base sides of the two isosceles triangles 218 and 219 are partially overlapped so that the hexagon has four long sides 211-214 with an equal first length, L1, and two short sides 215 and 216 with an equal second length, L2<L1. The four long sides 211-214 are corresponding to the congruent sides of the two isosceles triangles 218 and 219, while the two short sides 215 and 216 are corresponding to the non-overlapped portions of the bases of the two isosceles triangles 218 and 219. Further, each side is parallel to its corresponding opposite side. For example, the two opposite long sides 211 and 213 are parallel to each other; the two opposite long sides 212 and 214 are parallel to each other; and the two short sides 215 and 216 are parallel to each other. Additionally, each short side 215/216 defines an angle, α, relative to two adjacent long sides 211/213 and 214/214, respectively.

As shown in FIG. 3b, the second sensing pads 220a is of a hexagon having a first pair of opposite, parallel sides 221 and 224 with an equal first length, J1, a second pair of opposite, parallel sides 222 and 225 with an equal second length, J2<J1, and a third pair of opposite, parallel sides 223 and 226. The first pair of sides 221 and 224 is the longest sides, while the second pair of sides 222 and 225 is the shortest sides. As shown in FIG. 2b, each shortest side 222/225 defines an angle, β, relative to two adjacent sides 221/224 and 233/226, respectively.

In the exemplary embodiment, the angles α and β are complementary to each other, J1=L2 and J2=L2.

As shown in FIGS. 2 and 3c, the first and second sensing pads 210a and 220a are disposed complementarily along the first and second directions D1 and D2, respectively. Each first sensing pad 210a is surrounded by four adjacent second sensing pads 220a, and vice versus. For example, the long side 212 of the first sensing pad 210a is closest to and faces the side 226 of the second sensing pad 220a; the short side 215 of the first sensing pad 210a is closest to and faces the shortest side 225 of the second sensing pad 220a; and the long side 213 of the first sensing pad 210a is closest to and faces the longest side 224 of the second sensing pad 220b, and so on. As a result, each first sensing pad 210a and the corresponding second sensing pad 220a are entangled each other along with the second direction D2.

In this configuration, the pitches, Px and Py, of the sensing unit (electrode) along the first and second directions D1 and D2 are same as that of a conventional diamond-type sensing unit. However, the linearity and sensitivity of the touch detection of the touch sensing device of the present invention is improved because of the entanglement of the first and second sensing pads 210a and 220a with first and second complementary portions 2104, 2204.

Figure 4:
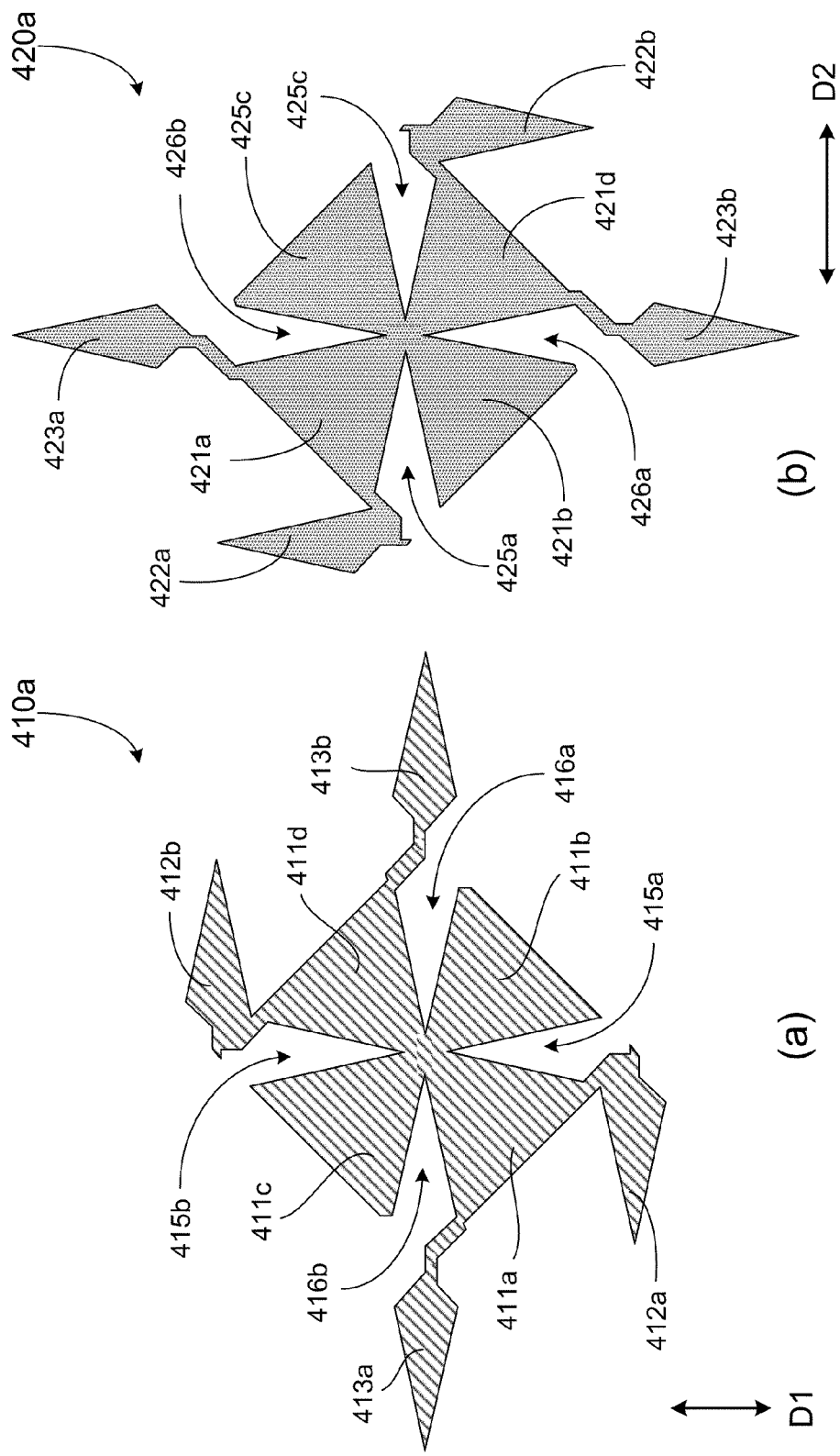
FIG. 4 shows schematically (a) a sensing pad, and (b) a second sensing pad according to a second embodiment of the present invention.
Figure 5:
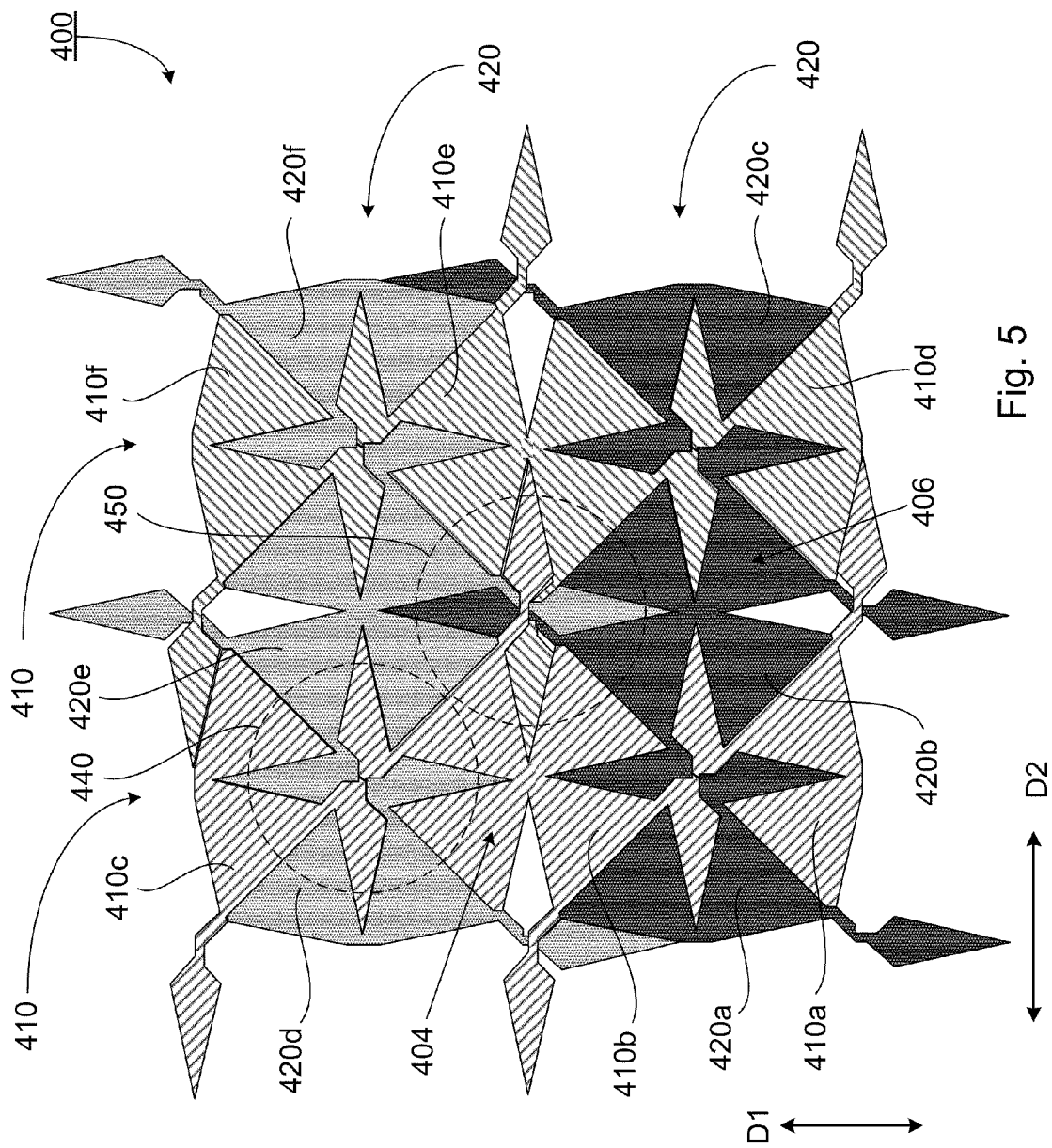
FIG. 5 shows schematically a top view of a touch sensing pad layout of the first sensing pads and second sensing pads according to the second embodiment of the present invention.

Referring to FIGS. 4 and 5, a touch sensing array 400 used in a touch sensing device is shown according to another embodiment of the present invention. The touch sensing array 400 includes a plurality of first touch electrodes 410, as shown in FIG. 4a, and a plurality of second touch electrodes 420, as shown in FIG. 4b. The plurality of first touch electrodes 410 and the plurality of second touch electrodes 420 are alternately arranged along a first direction D1 and a second direction D2 to form a sensing array 400. Each first touch electrode 410 has a plurality of identical first sensing pads 410a. Each second touch electrode 420 has a plurality of identical second sensing pads 420a. The first sensing pad 410a and the second sensing pad 420a are geometrically identical to each other. However, the first sensing pad 410a and the second sensing pad 420a, as assembled, are oriented along the first and second directions D1 and D2, respectively, such that each first sensing pad 410a and a corresponding second sensing pad 420a are entangled each other along the first and second directions D1 and D2.

As shown in FIG. 4a, the first sensing pad 410a, 410b, 410c or 410d has four first sensing portions 411a-411d forming a diamond-shaped polygon sensing portion, which defines four recesses 415a, 415b, 416a and 416b therein. The diamond-shaped polygon sensing portion is sized to be placed in a first sensing region 404 of the sensing array 400, as shown in FIG. 5. The first sensing pad 410a, 410b, 410c or 410d also has two first complementary portions 412a and 412b formed at bottom and top vertexes, respectively, of the diamond-shaped polygon sensing portion along the second direction D2, and two first extension portions 413a and 413b extending from left and right vertexes, respectively, of the diamond-shaped polygon sensing portion along the first direction D1. Each of the first complementary portions 412a and 412b and the first extension portions 413a and 413b is characterized with a dagger-like polygon that is substantially complementary to a geometric shape of the recesses 415a, 415b, 416a and 416b.

As shown in FIG. 4b, the second sensing pad 420a, 420b, 420c or 420d has four first sensing portions 421a-421d forming a diamond-shaped polygon sensing portion, which defines four recesses 425a, 425b, 426a and 426b therein. The diamond-shaped polygon sensing portion is sized to be placed in a second sensing region 406 of the sensing array 400, as shown in FIG. 5. The second sensing pad 420a, 420b, 420c or 420d also has two second complementary portions 422a and 422b formed at left and right vertexes, respectively, of the diamond-shaped polygon sensing portion along the first direction D1, and two second extension portions 423a and 423b extending from bottom and top vertexes, respectively, of the diamond-shaped polygon sensing portion along the first direction D1. Each of the second complementary portions 422a and 422b and the second extension portions 423a and 423b is characterized with a dagger-like polygon that is substantially complementary to a geometric shape of the recesses 425a, 425b, 426a and 426b.

Accordingly, when the first and second touch electrodes 410 and 420 are disposed in the first and second sensing regions 404 and 406, respectively, to form the sensing array 400, each first sensing pad 410a and a corresponding second sensing pad 420a are entangled each other along the first and second directions D1 and D2, so that each first touch electrode 410 and the corresponding second touch electrode 420 are substantially complementary to each other, as shown in FIG. 5. For example, the first complementary portions 412a and 412b of the first sensing pad 410b are disposed in the recess 425c of the second sensing pad 420a and the recess 425a of the second sensing pad 420e, respectively, and the first extension portions 413a and 413b of the first sensing pad 410b are disposed in the recess 416a of the first sensing pad adjacent to the left-side vertex of the first sensing pad 410b (not shown) and the recess 416b of the sensing pad 410e, respectively. Similarly, the second complementary portions 422a and 422b of the second sensing pad 420b are disposed in the recess 415a of the first sensing pad 410b and the recess 415b of the first sensing pad 410d, respectively, and the second extension portions 423a and 423b of the second sensing pad 420b are disposed in the recess 425d of the second sensing pad 420e and the recess 425b of the second sensing pad adjacent to the bottom vertex of the second sensing pad 420b (not shown), respectively. As a result, the first sensing pads 410a-410e and the second sensing pads 420a-420e are entangled each other through the first and second complementary portions 412a, 412b, 422a and 422b, and the first and second extension portions 413a, 413b, 423a and 423b, along the first and second directions D1 and D2.

In other words, all adjacent first and second touch electrodes 410 and 420 are entangled to each other not along the first and second directions D1 and D2, but also along the diagonal directions of the first and second directions D1 and D2. For example, as shown in FIG. 5, the first sensing pad 410b is entangled with not only four neighboring second sensing pads 420a, 420b, 420d and 420e, but also four neighboring first sensing pads 410a, 410c, 410e and one that is adjacent to the left-side vertex of the first sensing pad 410b (not shown). The second sensing pad 420b is entangled with not only four neighboring first sensing pads 410a, 410b, 410d and 410e, but also four neighboring second sensing pads 410a, 410c, 410e and one that is adjacent to the bottom-side vertex of the second sensing pad 420b (not shown). The same entanglement is also applied to other first sensing pads and second sensing pads. As such an arrangement, the first complementary portion 412b of the first sensing pad 410b and the first complementary portion 412a of its neighboring first sensing pad 410c along the first direction D1, and the second complementary portion 422b of the second sensing pad 420d and the second complementary portion 422a of its neighboring second sensing pad 420e along the second direction D2 define a first entangled region 440, while the first extension portion 413b of the first sensing pad 410b and the first extension portion 413a of its neighboring first sensing pad 410e along the second direction D2, and the second extension portion 423a of the second sensing pads 420b and the second extension portion 423b of its neighboring second sensing pad 420e along the first direction D1 define a second entangled region 450.

Similarly, the sensitivity of the touch detection of the touch sensing device of the present invention is improved because of the entanglement of the first and second touch electrodes 410 and 420.

Figure 6:
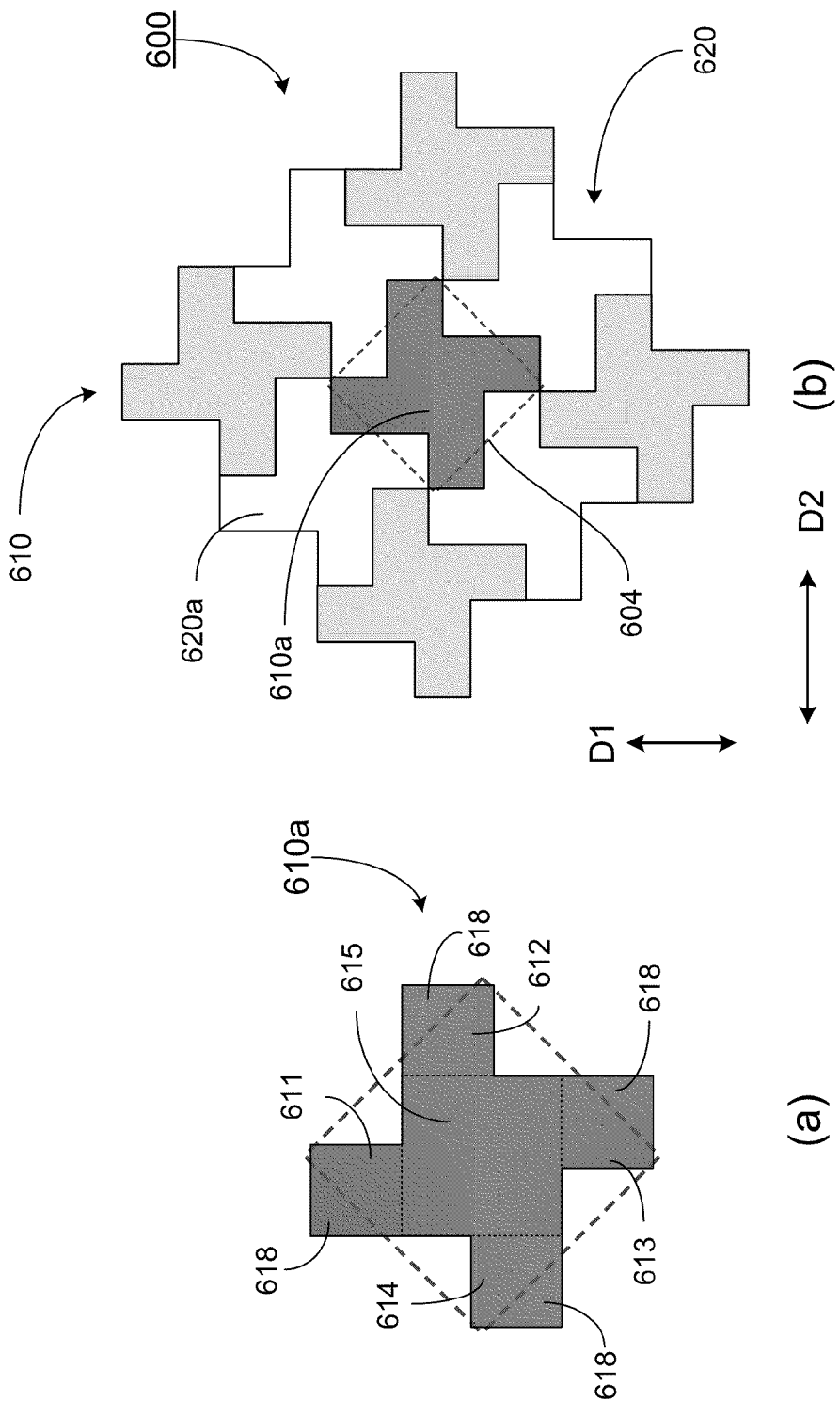
FIG. 6 shows schematically (a) a first sensing pad or a second sensing pad, and (b) a top view of a touch sensing pad layout of the first sensing pads and second sensing pads according to a third embodiment of the present invention.

Referring to FIG. 6, a touch sensing array 600 used in a touch sensing device is shown according to one embodiment of the present invention. The touch sensing array 600 includes a plurality of first touch electrodes 610, and a plurality of second touch electrodes 620, which is identical to the plurality of first touch electrodes 610. As shown in FIG. 6a, the first touch electrode 610 includes a plurality of star-like structures/sensing pads 610a. Each star-like sensing pad 610a has a rectangular body 615 and four rectangular members 611-614, with each rectangular member protruded from a corresponding side, respectively, of the rectangular body 615. The star-like sensing pad 610a/620a defines a touch sensing portion disposed in the sensing region 604 and the complementary portion 618 adapted for entangling with the neighboring sensing pads 610a and 620a. As shown in FIG. 6b, the plurality of first sensing pads 610a and the plurality of second sensing pads 620a are alternately arranged along a first direction D1 and a second direction D2 to form a sensing array 600. Each first sensing pad 610a and a corresponding second sensing pad 620a are entangled each other along with the first and second directions D1 and D2.

Figure 7:
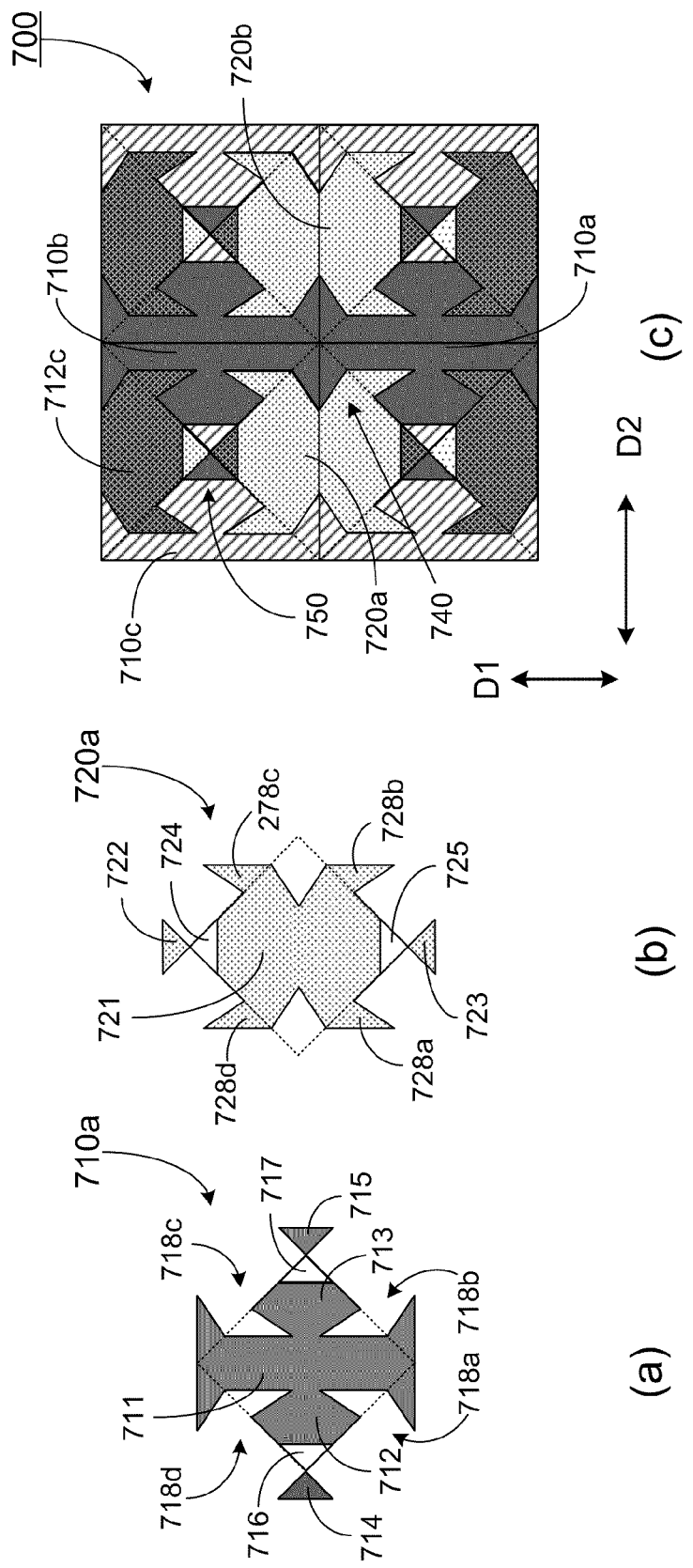
FIG. 7 shows schematically (a) a first sensing pad, (b) a second sensing pad, and (c) a top view of a touch sensing pad layout of the first sensing pads and second sensing pads according to a fourth embodiment of the present invention.

Referring to FIG. 7, a touch sensing array 700 used in a touch sensing device is shown according to another embodiment of the present invention. The touch sensing array 700 includes a plurality of first touch sensing pads 710a/710b, and a plurality of second touch sensing pads 720a/720b. Each first touch sensing pad 710a/710b is identical to one another and each second touch sensing pads 720a/720b is identical to one another as well. However, the first touch sensing pad 710a/710b and the second touch sensing pads 720a/720b are substantially different from each other.

As shown in FIG. 7a, the first touch sensing pad 710a is formed symmetrically along the first and second directions D1 and D2 and has an I-like structure 711 along the first direction D1, a pair of polygon structures 712 and 713 symmetrically extended from the middle portion of the I-like structure 711 alone the second direction D2, and a pair of triangular tips 714 and 715 symmetrically extending from the pair of polygon structures 712 and 713, respectively, alone the second direction D2. Additionally, there is a void portion 716/717 formed in each polygon structure 712/713. The void portion 716/717 is geometrically identical to the corresponding triangular tip 714/715. The I-like structure 711 and the pair of polygon structures 712 and 713 define a plurality of recesses 718a-718d.

As shown in FIG. 7b, the second touch sensing pad 720a is formed symmetrically along the first and second directions D1 and D2 and has a polygon structure having a body 721, four arms 728a-728d symmetrically extending from the body 721, two triangular tip 722 and 723 symmetrically extending from the body 721 along the first direction D1. The four arms 728a-728d are geometrically corresponding to the plurality of recesses 718a-718d of the first touch sensing pad 710a. The second touch sensing pad 720a also has two void portions 724 and 725 formed in the body 721. The void portion 724/725 is geometrically identical to the corresponding triangular tip 722/723.

As shown in FIG. 7c, in the sensing array 700, the first and second touch sensing pads 710a/710b and 720a/720b are substantially complementary to each other, and are entangled each other along with the first and second directions D1 and D2. For example, in an entangled region 740, all adjacent two first touch sensing pads 710a and 710b and two adjacent second touch sensing pads 720a and 720b are entangled to each other. In another entangled region 750, all adjacent two first touch sensing pads 710a and 710c and two adjacent second touch sensing pads 720b and 720c are entangled to each other, as well. Similarly, the sensitivity of the touch detection of the touch sensing device 700 of the present invention is improved because of the entanglement of the first and second touch sensing pads.

According to the present invention, the above-disclosed touch electrode/sensor array can be formed on any kind of substrate, such as a substrate within a plurality of the pixels of the display panel or in a blank substrate. The sensor array can be positioned into at least portion of the pixels and/or into a region without the pixels while the sensor array is disposed in the substrate of the display panel. The sensor array can be formed on the outer surface the upper substrate of a display panel. An auxiliary substrate can be optionally formed between the touch sensor array and the upper substrate. The touch sensor array also can be integrated between the color filter layer and the upper substrate.

The present invention, among other things, discloses a variety of sensor layouts of a touch sensing device, which utilizes the entanglement of the first and second touch electrodes to improve the sensitivity of the touch detection of the touch sensing device. Even the touch unit having a size larger than 12 inches, the touch detection of the touch sensing device still has good linearity and sensitivity.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A touch sensing device, comprising:
   a substrate having a plurality of first sensing regions and a plurality of second sensing regions arranged in a matrix, wherein each first sensing region is surrounded by four second sensing regions and vice versa;
   a plurality of first touch electrodes, alternately arranged along a first direction, each of the first touch electrodes including a plurality of first sensing pads, each of the first sensing pads having at least one first sensing portion disposed in a corresponding first sensing region and at least one first complementary portion disposed in a corresponding second sensing region; and
   a plurality of second touch electrodes, alternately arranged along a second direction substantially perpendicular to the first direction to form a sensing matrix, each of the second touch electrodes including a plurality of second sensing pads, each of the second sensing pads having at least one second sensing portion disposed in a corresponding second sensing region and at least one second complementary portion disposed in a corresponding first sensing region,
   such that each first sensing pad is surrounded by four second sensing pads and vice versa; and
   each first sensing pad is entangled with four neighboring second sensing pads surrounding the first sensing pad along with diagonal directions of the first and second directions, and at least two neighboring first sensing pads along with at least one of the first and second directions and vice versa.

2. The touch sensing device of claim 1, wherein a shape of the first complementary portion and the second complementary portion comprises a triangle or a rhombus.

3. The touch sensing device of claim 1, wherein the plurality of first touch electrodes and the plurality of second touch electrodes are electrically insulated from one another.

4. The touch sensing device of claim 1, wherein the first sensing pads of each of the first touch electrodes are electrically connected to each other in series, and the second sensing pads of each of the second touch electrodes are electrically connected to each other in series.

5. The touch sensing device of claim 1, wherein each of the first sensing pads is identical to or substantially different from each of the second sensing pads.

6. The touch sensing device of claim 1, wherein each of the first sensing pads has a shape of a polygon with more than four sides, and each of the second sensing pads has a shape of a polygon with more than four sides.

7. The touch sensing device of claim 1, wherein each short side of each of the first sensing pads is closest to and faces one shortest side of each of the second sensing pads correspondingly.

8. The touch sensing device of claim 1, wherein each of the first sensing pads further comprises at least one first extension portion extended to another first sensing pad adjacent thereto, and each of the second sensing pads further comprises at least one second extension portion extended to another second sensing pad adjacent thereto.

9. The touch sensing device of claim 8, wherein each of the first sensing pads comprises at least one first recesses corresponding to the at least one first extension portion, and each of the second sensing pads comprises at least one second recesses corresponding to the at least one second extension portion.

10. The touch sensing device of claim 1, wherein the first and second sensing pads are disposed such that each first sensing pad and the corresponding second sensing pad are substantially complementary to each other, and are entangled each other along with the first and second directions.

11. The touch sensing device of claim 10, wherein each of the first sensing pads and each of the second sensing pads are formed symmetrically along the first and second directions and have a polygon structure that is substantially complementary to each other.

12. The touch sensing device of claim 1, wherein each of the first touch electrodes and the second touch electrodes respectively is formed of a conductive material.

13. A touch sensing device, comprising:
    a plurality of first touch electrodes, each first touch electrode having a plurality of first sensing pads, and a plurality of second touch electrodes, each second touch electrode having a plurality of second sensing pads, alternately arranged along a first direction and a second direction substantially perpendicular to the first direction to form a sensing matrix, such that
    each first sensing pad is surrounded by four second sensing pads and vice versa; and
    each first sensing pad is entangled with four neighboring second sensing pads surrounding the first sensing pad along with diagonal directions of the first and second directions, and at least two neighboring first sensing pads along with at least one of the first and second directions and vice versa.

14. The touch sensing device of claim 13, wherein the plurality of first touch electrodes and the plurality of second touch electrodes are electrically insulated from one another.

15. The touch sensing device of claim 14, wherein the first sensing pads of each of the first touch electrodes are electrically connected to each other in series, and the second sensing pads of each of the second touch electrodes are electrically connected to each other in series.

16. The touch sensing device of claim 15, wherein each of the first sensing pads is identical to or substantially different from each of the second sensing pads.

17. The touch sensing device of claim 16, wherein each of the first sensing pads is of a polygon with more than four sides, and each of the second sensing pads is of a polygon with more than four sides.

18. The touch sensing device of claim 17, wherein each of the first sensing pads comprises a plurality of first sensing portions forming a diamond-shaped polygon, at least one first complementary portion and at least one first extension portion formed at corresponding vertexes of the diamond-shaped polygon along one of the first and second directions, wherein each of the at least one first complementary portion and the at least one first extension portion is characterized with a dagger-like polygon, and wherein the plurality of first sensing portions defines a plurality of recesses having geometric shapes substantially complementary to the at least one first complementary portion and the at least one first extension portion.

19. The touch sensing device of claim 18, wherein each of the second sensing pads comprises a plurality of second sensing portions forming a diamond-shaped polygon, at least one second complementary portion and at least one second extension portion formed at corresponding vertexes of the diamond-shaped polygon along the other of the first and second directions, wherein each of the at least one second complementary portion and the at least one second extension portion is characterized with a dagger-like polygon, and wherein the plurality of second sensing portions defines a plurality of recesses having geometric shapes substantially complementary to the at least one second complementary portion and the at least one second extension portion.

20. The touch sensing device of claim 19, wherein the first and second sensing pads are disposed such that each first sensing pad and the corresponding second sensing pad are substantially complementary to each other, and are entangled each other along with the first and second directions.

21. The touch sensing device of claim 17, wherein each of the first sensing pads is formed symmetrically along the first and second directions and has an I-like structure along the first direction, a pair of polygon structures symmetrically extended from the middle portion of the I-like structure alone the second direction, and a pair of triangular tips symmetrically extending the pair of polygon structures, respectively, alone the second direction.

22. The touch sensing device of claim 21, wherein each of the second sensing pads is formed symmetrically along the first and second directions and has a polygon structure that is substantially complementary to each of the first sensing pads.

23. The touch sensing device of claim 22, wherein the first and second sensing pads are disposed such that each first sensing pad and the corresponding second sensing pad are substantially complementary to each other, and are entangled each other along with the first and second directions.

24. The touch sensing device of claim 13, wherein each of the plurality of first touch electrodes and the plurality of second touch electrodes respectively is formed of a conductive material.

* * * * *